Figure 1:
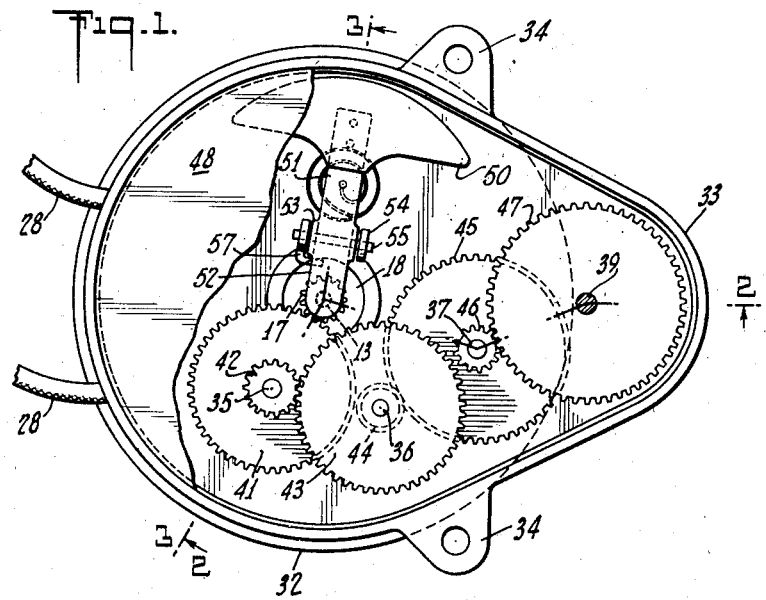

Nov. 9, 1943.  E. L. SCHELLENS  2,334,040
ELECTRIC MOTOR
Filed June 3, 1941

INVENTOR:
Eugene L. Schellens
BY
Morrison, Kennedy & Campbell
ATTORNEYS.

Patented Nov. 9, 1943

2,334,040

UNITED STATES PATENT OFFICE 2,334,040

ELECTRIC MOTOR

Eugene L. Schellens, Essex, Conn., assignor to The R. W. Cramer Company, Incorporated, Centerbrook, Conn., a corporation of Connecticut Application June 3, 1941, Serial No. 396,399

8 Claims. (Cl. 172—36)

This invention relates to electric motors, and particularly to motors of the known kind wherein the rotor or armature is axially shiftable by the magnetization of the motor or its field or other element, so as to be displaced in the direction of its own axis or shaft from a normal or idle position to a displaced or operating position. Synchronous or other small, light, encased motors are frequently constructed in this manner, the rotor shaft carrying a pinion or equivalent driving member which shifts with the rotor, and in its displaced position engages and drives a driven member or gear, usually the first member of a train of gearing, as for a clock or a time switch or a time delay relay, the return of the rotor to idle position causing disengagement of pinion from gear, and so releasing the train; although the pinion might instead remain coupled and the gear train be uncoupled or declutched at a point beyond.

Such an electric motor, used for driving clocks, time switches or relays and various miscellaneous purposes, is frequently referred to as a shift-unit motor, indicating that the energization of the motor, or the magnetization of a field, causes the bodily axial shift of rotor and shaft, utilized to close the coupling thereof with the driven train or final shaft when the motor is operating and to uncouple or release the train or final shaft when the motor is idle or inoperative.

An example of a small self-starting synchronous motor to which the invention is applicable is illustrated in the patent of A. W. Haydon, No. 2,049,261, of July 28, 1936, the rotor shaft pinion being shown in mesh with the first of a train of gears, although in said patent the shift-unit principle is not utilized, a later model of the same patentee however containing provision for unmeshing of pinion and gear by axial recession of the rotor when the motor is idle. No claim is made herein to the shift-unit principle itself, which was previously known; and the present invention comprises an improvement applicable to motors of the kinds referred to.

As heretofore marketed, motors with axially shiftable rotors, utilized to cause meshing with or unmeshing from a suitable gearing, have been subject to certain drawbacks which have limited their practical availability, and the general object of the present invention is to afford an improvement overcoming the limitations of the known shift-unit motors. It may here be explained that in the use of such a motor it has been customary to mount it with the rotor shaft vertical and the active portion of the rotor at the lower end, so that the magnetization of the motor field tended, on solenoid principles, to lift bodily the rotor and shaft into an operating position, the shutting off of the current releasing these parts to return by gravity to initial or normal position and, the parts being very light, it was customary to reenforce gravity by a spring pressing downwardly, tending to restore the parts to normal, but of such light force that the energized motor field could readily again displace or lift the rotor and shaft against the combined forces of the spring and gravity. While useful this construction suffered from the drawback that if the motor should be mounted in a different posture, as with the rotor shaft inverted, or horizontal, or lying in some other direction, the actions of displacement and return would be unreliable because of the material change in the relations or cooperation of the spring force and gravity. For example, if the axis be horizontal, as in a clock, the gravity force disappears; while in the case of an inverted motor, gravity would work directly against instead of with the restoring force of the light spring, so that a motor so constructed and positioned would be practically inoperative, certainly without effecting a replacement of the spring by a stronger one, or an adjustment of spring pressure or the like, which would be highly inconvenient or prohibitive.

A particular object of the present invention therefore is to afford a motor, preferably of the small encased kind, synchronous or otherwise, which possesses the shift-unit principle of automatic uncoupling of driven train with cutting off of the motor, and which can be mounted and used reliably in any and every conceivable position or posture, for clock or switch or other purposes, and without interference with the desired shiftings of the rotor between normal or initial and active or displaced positions. In other words with the present invention when the motor is thrown into action the rotor shifts reliably to couple and drive the driven train, and when the motor becomes idle these parts return reliably to initial position to disengage the gearing. With this invention therefore the motor can be counted upon to unmesh itself from the driven gearing, and this possesses substantial value, as for example to permit the free setting of the gear train, when idle, as for a clock or time switch, without the otherwise necessary high speed rotation of the rotor itself during the resetting operation, which would be so impractical as substantially to preclude the resetting.

Other objects and advantages of the invention will be pointed out in the hereinafter following description of an illustrative embodiment of the invention. To the attainment of such objects and advantages the present invention consists in the novel electric motor and the novel features of operation, combination, arrangement and construction herein illustrated or described.

Figure 2:
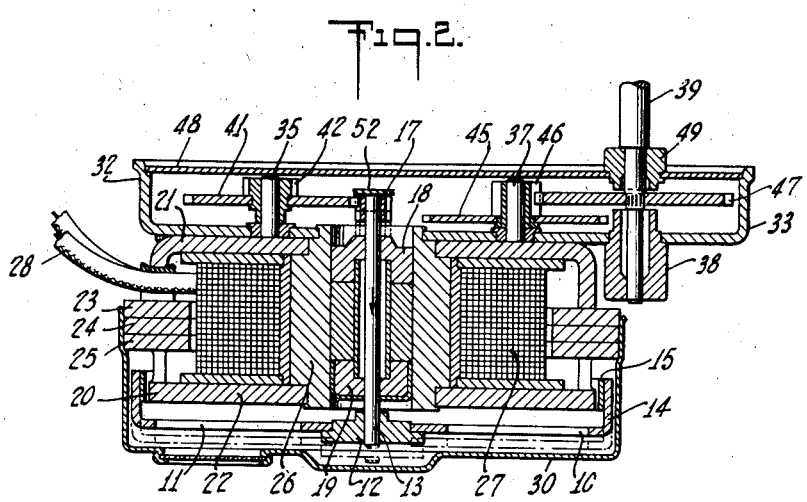
Figure 3:
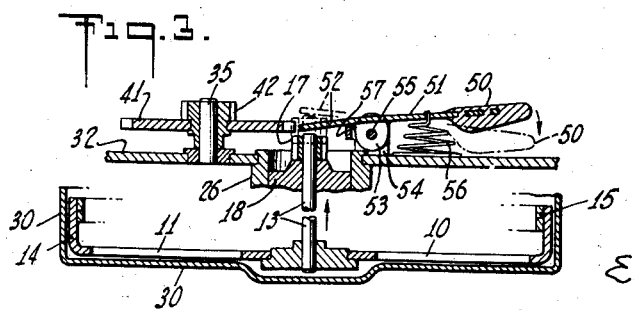

In the accompanying drawing Fig. 1 is a top plan view of an electric motor in which are embodied an example of the improvement features of the present invention, an upper enclosing wall being partly omitted for the better showing of the parts therebelow. In using such relative terms as upper and lower, above and below, and up and down, for description purposes, it is not intended to indicate restriction thereto especially since, by the very principles of the present invention, the motor may be inverted or set in various different postures. Fig. 2 is a vertical section view taken along the crooked section line 2—2 of Fig. 1 and showing the electric parts of the motor. Fig. 3 is another vertical section view, but taken along the crooked section line 3—3 of Fig. 1.

By way of providing the advantages and operation previously indicated the general principles of the present invention include the neutralizing of the weight, that is, the gravity force upon, the axially shiftable rotor or armature, including of course all parts carried by it, such neutralizing being of the character of a balancing out of the gravity effect by providing a balancing weight, and so associating this weight or countermass with the rotor that the gravity forces are eliminated, with the result that the motor may be mounted and used in any desired posture, whether with the rotor shaft in the upright posture shown in the drawing, or an inverted or any other posture. The counterweight is mounted and connected so that it may shift parallel to the axial shaft of the rotor but in the opposite direction, thus providing the neutralizing or cancelling out of the gravity effect. Under these circumstances the action of the magnetic field may operate to shift the rotor from the normal or idle position to a displaced or active position when energized, while when the motor is deenergized a restoring spring or resilient means may return the rotor to normal position, all without gravity interference.

Before describing the illustrated embodiment of these principles the well known elements and characteristics of an available motor will be described, and the shift-unit features thereof, leaving the novel parts, combination and action for the final description. The motor is best shown in Fig. 2 as comprising in general the rotor or armature 10 and the stator or field structure 20, the parts of the latter constituting also the frame of the motor.

The rotor 10 is shown as comprising a light disk or spider 11 of aluminum or brass or other non-magnetic metal mounted on a hub 12 attached to the rotor shaft 13. At its periphery the spider carries a flange 14, and on this flange is shown mounted the magnetically active element or ring 15 of the motor; in the case of a synchronous motor this being for example of hardened steel, with a suitable hysteresis coefficient. By this well known arrangement, when the field is energized by rotating magnetism the reaction with the ring 15 causes rotation of the rotor.

The rotor shaft 13 at its upper or coupling end is provided with a driving member or pinion 17 adapted to be engaged with and drive the gear train to be described. The shaft is shown as turning in an upper bearing 18 and a lower bearing 19, in which the shaft may also slide axially between an initial, normal or idle position, shown in Fig. 3 and in dotted lines in Fig. 2, and a displaced, upper or operating position shown in full lines in Fig. 2 wherein the driving pinion is meshed or coupled with the driven gearing. As is well understood in this type of motor, when the fields are energized there is produced not only rotation of the rotor but initial axial shifting thereof into operating position. The reaction of the field and the rotor may be analogous to that of a solenoid, and the rotor and its shaft are shifted axially into a magnetically balanced or poised position, for example, in Fig. 2, being raised to the position shown, where it substantially floats, needing no stop for the rising shift. When however the motor is deenergized it becomes desirable to restore the rotor to a definite normal or lowered position, and for this purpose a stop may be provided, illustratively shown as the lower part of the pinion 17 coming into contact upon the upper part of the bearing 18.

The field portion 20 of the structure may be conventional and variously designed. Fig. 2 shows an upper field section 21 and a lower section 22, for example of soft iron, the outer portions of these being extended around toward each other and there carrying pieces 23, 24 and 25, preferably of copper, which are shaped around one section of each of the poles and constitute shading or phase shifting members. The field structure may be completed by the soft iron core 26 within which are mounted the rotor bearings and surrounding which is the magnetizing or field coil 27, to be energized by alternating current supplied through lead wires 28. The described parts 21 to 26 may be considered the motor frame and may be solidly united by welding, brazing or other attachment.

In order that the motor may be encased and protected, as is customary, there is shown removably applied to its frame a housing cap 30, or sheet metal member of cup shape, shown as frictionally engaged upon the periphery of the frame members 23—25. The central part of the rotor cup is shown dished to accommodate the rotor hub in its idle position. Similarly at the other end of the motor is shown a second sheet metal cup or cap 32, which may be oil filled and accommodate the permanent gear train to be described. The cap 32 is preferably united to the motor frame portion 21 in a permanent manner, as by welding, and it is preferably of oval or pear shape as seen in Fig. 1, with a lateral extension 33 to accommodate one or more of the gears of the train. Its rim also is provided with ears 34 as a convenient means for mounting the motor in any desired location and posture. Within the gear train cup, to support certain of the gears, are shown successive upright pins or axles 35, 36 and 37, while in the extension is arranged a shaft bearing 38, to receive the lower end of the final driven shaft 39, which may be considered the main shaft of the train and constitute the time shaft of the clock or switch.

The gear train within the cup 32 is shown merely as an illustration, and it comprises an initial gear 41 which may directly engage and be driven by the rotor shaft pinion 17. The gear train is designed to give a considerable speed reduction, and fast with the gear 41 is shown a pinion 42, these turning loosely upon the axle pin 35. The pinion 42 in turn meshes with a gear 43 which, with its attached pinion 44, turns loosely on the axle 36. The pinion 44 drives a gear 45 which, with its pinion 46, turns loosely upon the axle 37. This final pinion 46 meshes with and drives a gear 47 fast on the main or final shaft 39. These parts are housed within the gear cup 32 which is shown closed above by a plate 48, which may be removable at will or preferably permanently attached as by soldering, and this plate may carry an outer bearing 49 for the end of the shaft 39 which issues to an accessible point where it may be coupled in any desired manner to any mechanism to be operated. The space within the gear housing 32, 48 may be kept full of lubricating oil.

It is highly desirable that the final gear 47 and main shaft 39 may be uncoupled from the shaft 13 of the motor, for without such uncoupling, the shaft 39 could not be turned or adjusted freely at will but only accompanied by rotation through the gear train to the rotor, with high speed multiplication, impractical to perform mechanically. Therefore, in effect, while the final shaft 39 can be driven by the motor shaft, the latter can not be driven by the final shaft. The uncoupling or unclutching of the gear train may be effected at any desired point between the shafts 13 and 39, and is preferably caused by the axial return of the rotor shaft to normal position. Preferably and most conveniently, in this type of motor, the uncoupling of the gear train is effected by providing the drive pinion 17 or the first gear 41 of such thin dimension that the pinion is carried out of engagement with the first gear when the rotor shaft is restored to idle position, as indicated in Fig. 3 and in dotted lines in Fig. 2. When the shaft and pinion are in such idle position it is then readily possible to adjust or reset the main shaft 39 and mechanism therebeyond, merely by causing the spinning of the gear train 47—41, without actuating the rotor.

The pinion 17 is shown at the opposite end of the rotor shaft from the rotor disk, but manifestly might be otherwise positioned, for example near the same end, so long as it has proper relation to the gear train, which then could be within the same housing cup 30 with the disk. With the present invention the shift-unit principle can be variously utilized in an electrodynamic machine or motor. The field-actuated shift of its armature may act to cause any operation of any device or coupling, that shown being illustrative.

As already explained the mechanism so far described is impractical or even inoperative unless the motor be mounted in a given posture. It has been customary to provide a light spring to press down the shaft 13 and carried parts, the spring pressure and gravity combined being able to lower the rotor to idle position when the field is deenergized, but being so calculated that these two forces may reliably be overcome when the field is magnetized, so that the rotor and shaft are elevated into operating position with the pinion in mesh with the first gear. It is the gravity part of this operation that renders the action unreliable or inoperative except in the upright position of the motor. This is overcome, and the use of the motor rendered universal, by neutralizing the weight of the rotor and shaft by the providing of a counterweight 50, which is shown designed as a flat mass adapted to be accommodated within the gear train cup, and there to move up and down, or parallel to the rotor shaft, but always in an opposite direction.

The balancing mass 50 may be composed of lead to minimize its bulk, and for a suitable mounting it is shown attached to the end of a lever arm 51 which can swing up and down, as indicated in Fig. 3. The lever is preferably of the first class, having a second and shorter arm 52 extending inwardly for operative engagement with the rotor shaft. The middle pivot of the lever may be provided as follows. The lever has a pair of depending ears 53 which extend between a pair of upstanding ears 54 secured to the floor of the gear cup 32, with a pivot shaft 55 extending through perforations in the four ears.

By having the countermass lever arm 51 longer than the arm 52, for example twice the effective length, the weight 50 is increased in effectiveness, so that it may be made relatively small and yet effectively counterbalance and neutralize the weight of the shaft 13 and rotor.

As a restoring force to return the rotor to normal position a resilient means is shown in the form of a light spring 56; and this is preferably applied to the countermass rather than to the shaft 13, for example by lifting upon the lever arm 51, thus providing a continuous tendency to lift the weight and restore downwardly the shaft and rotor. When the motor is running the spring 56 is somewhat compressed, the mass 50 is lowered, and the arm 52 is elevated, due to the displaced position of the shaft 13, as seen in dotted lines in Fig. 3. When the motor is deenergized the spring reasserts itself, causing a quick return to normal position. During these actions the weights of the oppositely moving parts are substantially balanced, so that gravity is not taken into account, and the displacing and restoring movements are controlled entirely by the magnetic action in one direction, overcoming the spring, and the spring action in the other direction. The purposes and advantages of the invention as already described are thus attained.

As a supplemental detail or refinement, it is preferable that the reactions between the lever arm 52 and shaft 13 are entirely by pushing contact, as shown, and that when the rotor has returned to normal position a small gap or clearance exists, or is allowed, between the shaft end and the lever end, as seen in full lines in Fig. 3. This is brought about by providing a fixed stop 57, being a small bent extension of one of the ears 54, this extending beneath the lever arm 52 which is thereby stopped under the spring action, leaving the gap referred to. The value of this arrangement is that whenever the motor is energized, causing the rotation and lifting of the shaft 13, the lift is the more readily initiated for the reason that the magnetic force has only to overcome the inertia of the rotor. When the shift is once started it is readily carried through against the light spring resistance and the additional inertia of the countermass 50. On the other hand when the spring is to effect the restoration to normal position it is able to provide sufficient shifting momentum to carry the rotor through to its normal position while the lever is brought to rest against the stop 57.

While the counterweight 50 has been shown acting at the upper end of the rotor shaft, opposite to the end carrying the rotor disk, manifestly it might act at the same end therewith; and the mechanical mounting of the counterweight might be other than the swinging mounting illustrated, so long as its movements are opposite to those of the rotor. The spring too might be variously arranged to carry out the function of restoring to normal position the rotor, for example near the same end of the shaft as the rotor disk, except that, when a mechanical gap is provided between the shaft and the counterweight the spring naturally should be at the counterweight side of the gap. By using the lever principle for a connection between the counterweight and shaft the balancing of weights may be accurately brought about by proportioning the weights inversely to the effective length of the two lever arms. It is the effective weight of the mass, or its effect at the shaft line, that is to balance the weight of the rotor. In referring to a spring means to restore the rotor it is intended to include any resilient device providing the necessary tendency or force, such as a pneumatic force, or a magnetic force, so long as its action is independent of gravity. The shift of the rotor has been shown as effecting directly the uncoupling of the gear train between shafts 13 and 39, but instead this might be directly effected, as by a separate magnet, or a relay, automatically actuated and timed.

As a matter of broad definition, the rotor may be considered as comprising any shaft of the motor which rotates and communicates the drive to the gear train so long as it is axially shiftable due to magnetic action or pull. The magnetic field causing such shift of rotor is preferably but not necessarily that of the motor as an auxiliary coil might be provided for the purpose. The coupling or engagement between rotor shaft and driven train while shown as a mere meshing of two gears might be of other types, as a ratchet device or an axial clutch or a centrifugal clutch.

There has thus been described an electric motor of the class referred to and embodying the principles characterizing the present invention. Since many matters of operation, combination, arrangement and construction may be variously modified without departing from the principles of the invention it is not intended to limit the invention to such matters except to the extent set forth in the appended claims.

What is claimed is:

1. In a shift-unit motor wherein the magnetic pull of its energized field is operative to shift the rotor from its idle initial position to an active displaced floating position and such shift causes the coupling of the rotor to a driven train; cooperating means to control the rotor shiftings between idle and active positions, comprising, a spring adapted per se to return the rotor to idle position when the motor is deenergized but to be overcome by the magnetic pull in shifting to active floating position, said spring being of a predetermined strength to equal and neutralize the magnetic pull when the rotor is in its floating position; and a counterweight mounted and connected to the rotor to shift in parallel but opposite direction to the shift of the rotor, said counterweight being of a predetermined mass the effective gravity of which equalizes and neutralizes the gravity of the rotor in all postures of the motor; whereby through the pairing off and mutual neutralizing of the effective gravities of the rotor and counterweight, the gravity of the rotor is eliminated as a factor that changes with motor posture, and the spring-controlled magnetic shift of the rotor is reliable in its coupling and uncoupling actions.

2. A shift-unit motor as in claim 1 and wherein is a first-class lever between rotor and counterweight affording opposite parallel movements thereof, said lever having unequal arms with the short arm engaging the rotor shaft and the long arm carrying the counterweight thus affording multiplied gravity force of counterweight effective applied at the axial shaft line.

3. A shift-unit motor as in claim 1 and wherein is a first-class lever between rotor and counterweight affording opposite parallel movements thereof; and wherein said spring is a compact compression spring applied to the counterweight arm of the lever at the motor side thereof, thereby tending to return the rotor to idle position.

4. A shift-unit motor as in claim 1 and wherein is a first-class lever between rotor and counterweight affording opposite parallel movements thereof; said lever being of light metal and having the counterweight on an arm substantially longer than the other, and the counterweight being of heavy metal.

5. A shift-unit motor as in claim 1 and wherein is a first-class lever between rotor and counterweight affording opposite parallel movements thereof; said lever being of light metal and having the counterweight on an arm substantially longer than the other, and the counterweight being of heavy metal; and wherein the motor and lever are enclosed within a circular casing and the counterweight is a flat segmental piece at the extremity of the long lever arm, and the spring is a compact compression spring acting upon the lever.

6. In a shift-unit motor adapted to be mounted in any desired posture, wherein the magnetic pull of its energized field is operative to shift the rotor from its idle initial position to an active displaced floating position and such shift causes the coupling of the rotor to a driven train; cooperating means to control the rotor shiftings between idle and active positions, comprising, a spring adapted per se to return the rotor to idle position when the motor is deenergized but to be overcome by the magnetic pull in shifting to active floating position, said spring being of a predetermined strength to equal and neutralize the magnetic pull when the rotor is in its floating position; and a counterweight mounted and connected to the rotor to shift in parallel but opposite direction to the shift of the rotor, said counterweight being of a predetermined mass the effective gravity of which equalizes and neutralizes the gravity of the rotor in all postures of the motor; and the connections between rotor and counterweight being a train containing a short mechanical gap which opens when the rotor is fully retracted to idle position whereby, when the motor is energized, the magnetic pull on the rotor can freely start the rotor shift without shifting the counterweight until the gap is closed.

7. A shift-unit motor as in claim 6 and wherein is a stop limiting the return shift of the counterweight and thereby affording such gap.

8. A shift-unit motor as in claim 6 and wherein is a lever between the rotor shaft and counterweight, the spring acting on the lever, and the gap being between the shaft and lever, whereby the initial shift of rotor is free both of the counterweight inertia and the spring force.

EUGENE L. SCHELLENS.